US012636739B2

(12) United States Patent
Gemignani et al.

(10) Patent No.: US 12,636,739 B2
(45) Date of Patent: May 26, 2026

(54) HOUSING FOR A LASER PROCESSING MACHINE AND LASER PROCESSING MACHINE HAVING A HOUSING

(71) Applicant: BLM S.P.A., Cantù (IT)

(72) Inventors: Roberto Gemignani, Cantù (IT); Andrea Crosato, Cantù (IT); Davide Raffaelli, Cantù (IT); Corrado Cattaneo, Cantù (IT); Giovanni Riva, Cantù (IT); Andrea Colombo, Cantù (IT)

(73) Assignee: BLM S.P.A., Cantu (IT)

( * ) Notice: Subject to any disclaimer, the term of this patent is extended or adjusted under 35 U.S.C. 154(b) by 749 days.

(21) Appl. No.: 18/073,724

(22) Filed: Dec. 2, 2022

(65) Prior Publication Data

US 2023/0173622 A1     Jun. 8, 2023

(30) Foreign Application Priority Data

Dec. 3, 2021     (IT) ........................ 102021000030638

(51) Int. Cl.
*B23K 37/006*        (2025.01)
*B23K 26/38*         (2014.01)

(52) U.S. Cl.
CPC ............ *B23K 37/006* (2013.01); *B23K 26/38* (2013.01)

(58) Field of Classification Search
CPC .............................. B23K 26/38; B23K 37/006
USPC ...................................................... 219/121.86
See application file for complete search history.

(56) References Cited

U.S. PATENT DOCUMENTS

| | | | | |
|---|---|---|---|---|
| 5,531,348 A * | 7/1996 | Baker | ..................... | B65F 1/163 |
| | | | | 220/264 |
| 5,555,740 A * | 9/1996 | Stevenson | ............... | F25B 27/00 |
| | | | | 417/234 |
| 5,622,416 A * | 4/1997 | Rainey | .................... | E05F 11/54 |
| | | | | 312/319.9 |
| D436,427 S * | 1/2001 | Grendahl | ....................... | D99/35 |
| 7,415,794 B1 * | 8/2008 | Thompson | ............. | A01K 97/22 |
| | | | | 206/315.11 |
| 7,921,683 B2 * | 4/2011 | Largay, Jr. | .............. | E05B 65/52 |
| | | | | 70/164 |

(Continued)

FOREIGN PATENT DOCUMENTS

| | | | |
|---|---|---|---|
| EP | 2851604 A1 | 3/2015 | |
| WO | WO-2017103780 A1 * | 6/2017 | ......... B23Q 11/0825 |

OTHER PUBLICATIONS

Italian Seach Report dated Jun. 23, 2022 for Italian Application No. 202100030638.

*Primary Examiner* — Jimmy Chou
(74) *Attorney, Agent, or Firm* — McCarter & English, LLP

(57)     ABSTRACT

A housing for a laser processing machine is described comprising a dividing wall, which separates a first work space and a second work space, and a covering device, which is configured to selectively cover at least one between the first work space and the second work space. The covering device comprises at least a cover, which is controllable in an active configuration, in which the cover is configured to cover one between the first work space and the second work space and a guide system, which is configured to guide the cover so that the cover, when it is in the active configuration, comprises at least a main portion and an auxiliary portion extending from the main portion and being inclined relative to the main portion.

17 Claims, 7 Drawing Sheets

(56)  References Cited

U.S. PATENT DOCUMENTS

| | | | | |
|---|---|---|---|---|
| 8,789,745 B1 * | 7/2014 | Barbary | .................... | A45C 1/12 |
| | | | | 446/8 |
| 10,232,459 B2 * | 3/2019 | Hoffman | .............. | B23K 37/006 |
| 11,498,174 B1 * | 11/2022 | Butterworth | .............. | F16P 1/06 |
| 2002/0079315 A1 * | 6/2002 | Yang | ......................... | B65F 7/00 |
| | | | | 220/908 |
| 2003/0000955 A1 * | 1/2003 | Lee | ....................... | A23B 7/0425 |
| | | | | 220/848 |
| 2003/0019873 A1 * | 1/2003 | Nam | ................... | E05D 11/1078 |
| | | | | 220/826 |
| 2005/0230396 A1 * | 10/2005 | Yang | ....................... | B65F 1/163 |
| | | | | 220/264 |
| 2008/0245793 A1 * | 10/2008 | Hanson | .................. | A45C 11/20 |
| | | | | 220/592.2 |
| 2009/0314779 A1 * | 12/2009 | Lee | ......................... | B65F 1/163 |
| | | | | 220/263 |
| 2012/0211499 A1 * | 8/2012 | Clement | ................ | A45C 11/20 |
| | | | | 220/592.2 |
| 2016/0158888 A1 * | 6/2016 | Liu | .......................... | G02B 7/04 |
| | | | | 359/809 |
| 2017/0233139 A1 * | 8/2017 | Averill | ................... | B65D 85/76 |
| | | | | 220/533 |
| 2018/0147650 A1 * | 5/2018 | Hoffman | .............. | B23K 37/006 |
| 2018/0161827 A1 * | 6/2018 | Jasper | .................... | B08B 13/00 |

* cited by examiner

HOUSING FOR A LASER PROCESSING MACHINE AND LASER PROCESSING MACHINE HAVING A HOUSING

CROSS-REFERENCE TO RELATED APPLICATIONS

This patent application claims priority from Italian patent application no. 102021000030638 filed on Dec. 3, 2021, the entire disclosure of which is incorporated herein by reference.

TECHNICAL FIELD

The present invention relates to a housing, in particular having a first work space and a second work space, for a laser processing machine.

Advantageously, the present invention also relates to a laser processing machine having a housing, in particular a housing having a first work space and a second work space.

BACKGROUND

Laser processing machines for treating, by means of a laser device, work pieces are known. Such treatments can be for example the cutting and/or the incision of the work pieces, the laser welding and others.

Since the laser radiations used during such treatments can be harmful for an operator, such laser processing machines must comprise a housing which allows screening the laser radiations.

Some of the laser processing machines comprise a housing which has a first work space and a second work space separated from one another by means of a dividing wall having a lower portion and an upper portion.

Each one of the first work space and second work space is configured to receive work pieces.

It is known that such laser processing machines comprise at least one laser device which can be placed both in the first work space to carry out a laser processing in the first work space and in the second work space to carry out a processing in the second work space.

Furthermore, the housing has a first entrance and a second entrance for accessing the first work space and the second work space, respectively. Additionally, the housing also comprises a first door and a second door for selectively opening and closing the first entrance and the second entrance, respectively.

An advantage of this type of housing lies in the fact that it is possible to carry out a laser processing in one between the first work space and the second work space and to load and/or unload work pieces in the other between the first work space and the second work space. It should be noted that the other one of the first work space and the second work space must be screened.

Typically, horizontal covers extending from the dividing wall to a lateral wall are used for covering the other between the first work space and the second work space.

Furthermore, it should be considered that at least some housings provide, in order to allow a possible shifting of the laser device between the first work space and the second work space, an opening in the dividing wall and a closing wall controllable in a closed position and an open position in which the closing wall closes and opens the opening, respectively. In fact, during the shifting of the laser device it is necessary to open the opening, while during the activation of the laser device it is necessary to close the opening by means of the closing element.

Even if such housings allow a satisfactory operation, some drawbacks associated with the closing element are observed. These drawbacks can consist in the time necessary for the opening and the closing, in the need to ensure the light sealing, in possible breakdowns which determine a down time and in the need for the presence of sensors which detect with precision the effectiveness of the closing of the closing element when it is in the closed position so as to prevent any "lights" from inadvertently remaining open.

Therefore, the need is felt in the sector for a further improvement of the housings for laser processing machines and/or of the laser processing machines which allows solving at least one of the known drawbacks.

SUMMARY

The aforementioned objects are achieved by the present invention, since it relates to a housing as defined in the independent claim. Alternative preferred embodiments are protected in the respective dependent claims.

The aforementioned objects are also achieved by the present invention, since it relates to a machine according to claim 10. Alternative preferred embodiments are protected in the respective claims directly or indirectly dependent on claim 10.

BRIEF DESCRIPTION OF THE DRAWINGS

In order to better understand the present invention, a preferred embodiment is described in the following, by way of mere non-limiting example and with reference to the accompanying drawings, wherein.

DESCRIPTION OF EMBODIMENTS

Figure 1:
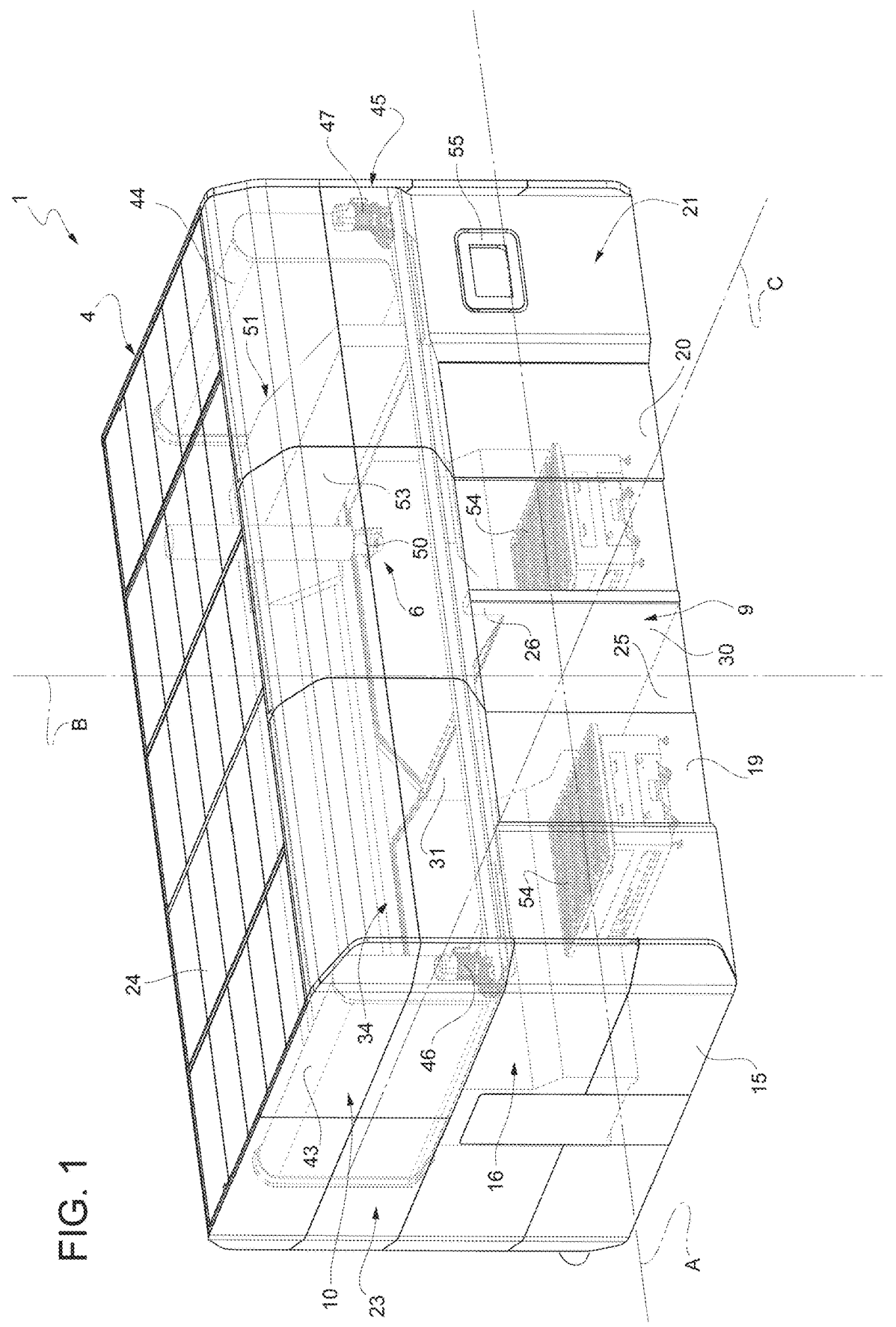
FIG. 1 is an isometric view of a laser processing machine according to the present invention, with parts removed for clarity.

In FIG. 1, reference numeral 1 indicates, as a whole, a laser processing machine for treating, by means of a laser, work pieces 2 for obtaining processed pieces 3.

According to some non-limiting embodiments, the machine 1 can be configured to carry out one or more of the following laser processing processes: cutting, engraving, boring, welding, cropping, butt joining, and other.

According to some non-limiting embodiments, the work piece 2 can comprise, in particular consist of, a metal material such as for example steel, carbon steel, stainless steel, aluminium, brass, copper, titanium alloys and other alloys or any combination thereof.

The work pieces 2 can have complex or simple structures. For example, the work pieces 2 can have respective (complex) three-dimensional structures or bi-dimensional structures.

The work pieces 2 can be for example unfinished products, as possibly obtained by means of curvature, printing, hydroforming or other processes.

For example, work pieces 2 can be curved pipes, formed sheets, other types or combinations thereof.

With reference to FIGS. 1 to 4, the machine 1 comprises:

a housing 4, in particular having and/or delimiting an inner space 5; e a laser apparatus 6 arranged in the housing 4, in particular in the inner space 5, for carrying out a laser processing on work pieces 2.

In more detail, the housing 4 extends along a first axis A, a second axis B perpendicular to the first axis A and a third axis C perpendicular to the first axis A and to the second axis B. In particular, the first axis A and the third axis C can have respective horizontal orientations and the second axis B can have a vertical orientation.

Preferentially, the extension of the housing 4 along:

the first axis A can define a width of the housing 4;

along the second axis B it can define a height of the housing 4; and along the third axis C it can define a depth of the housing 4.

The housing 4 comprises a first work space 7 and a second work space 8 distinct and separate from one another and each configured to receive work pieces 2.

The housing 4 further comprises a dividing wall 9, in particular placed in the inner space 5, which separates the first work space 7 and the second work space 8 from one another. In other words, the dividing wall 9 is interposed between the first work space 7 and the second work space 8.

Furthermore, the housing 4 comprises a covering device 10, in particular placed in the inner space 5, configured to selectively cover at least one between the first work space 7 and the second work space 8. In particular, the covering device 10 can be configured to cover one between the first work space 7 and the second work space 8 and to free the other between the first work space 7 and the second work space 8.

Figure 2A:
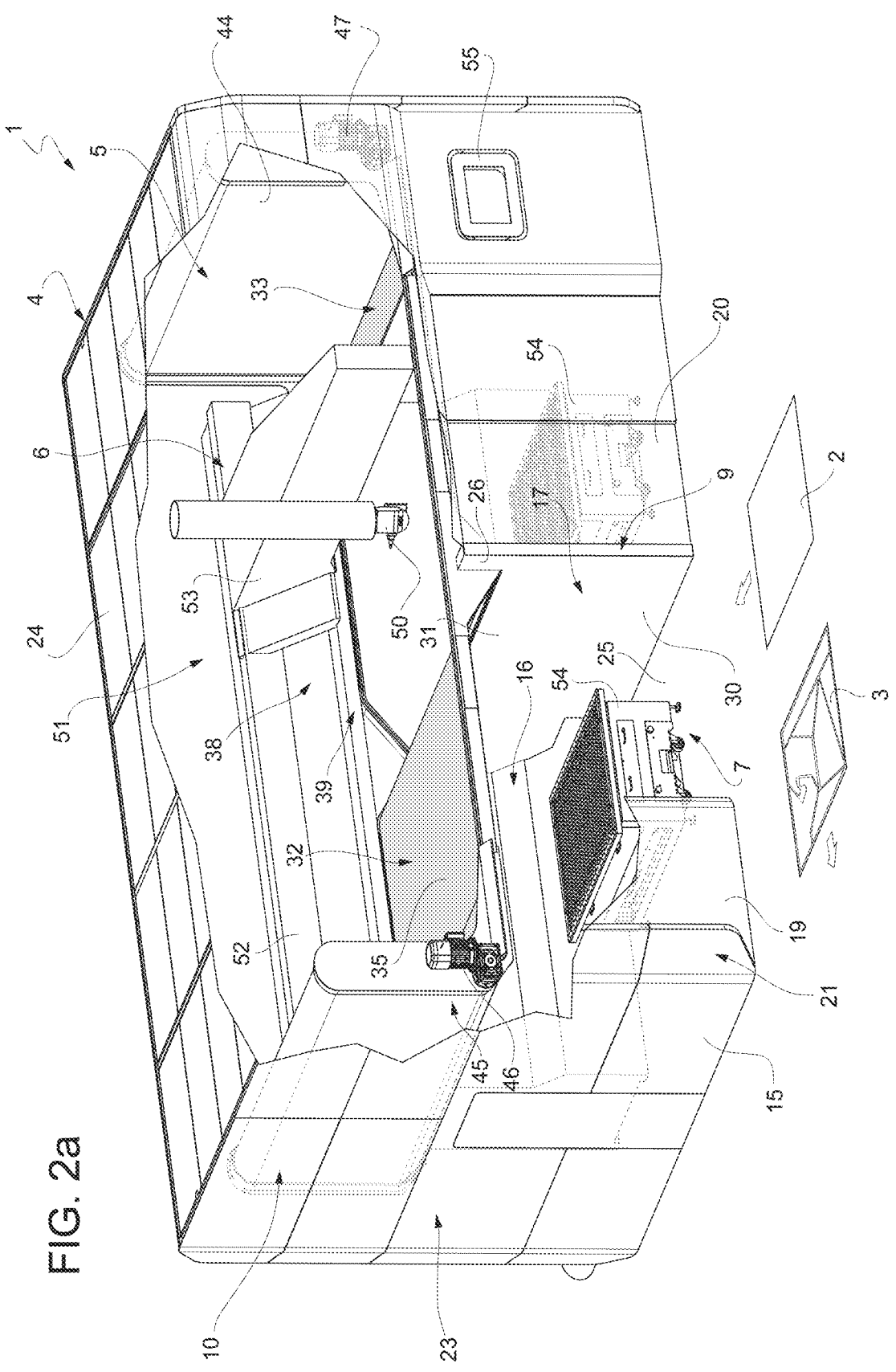
FIGS. 2a and 2b are isometric views of the laser processing machine of FIG. 1 in two distinct work configurations, with parts removed for clarity.
Figure 2B:
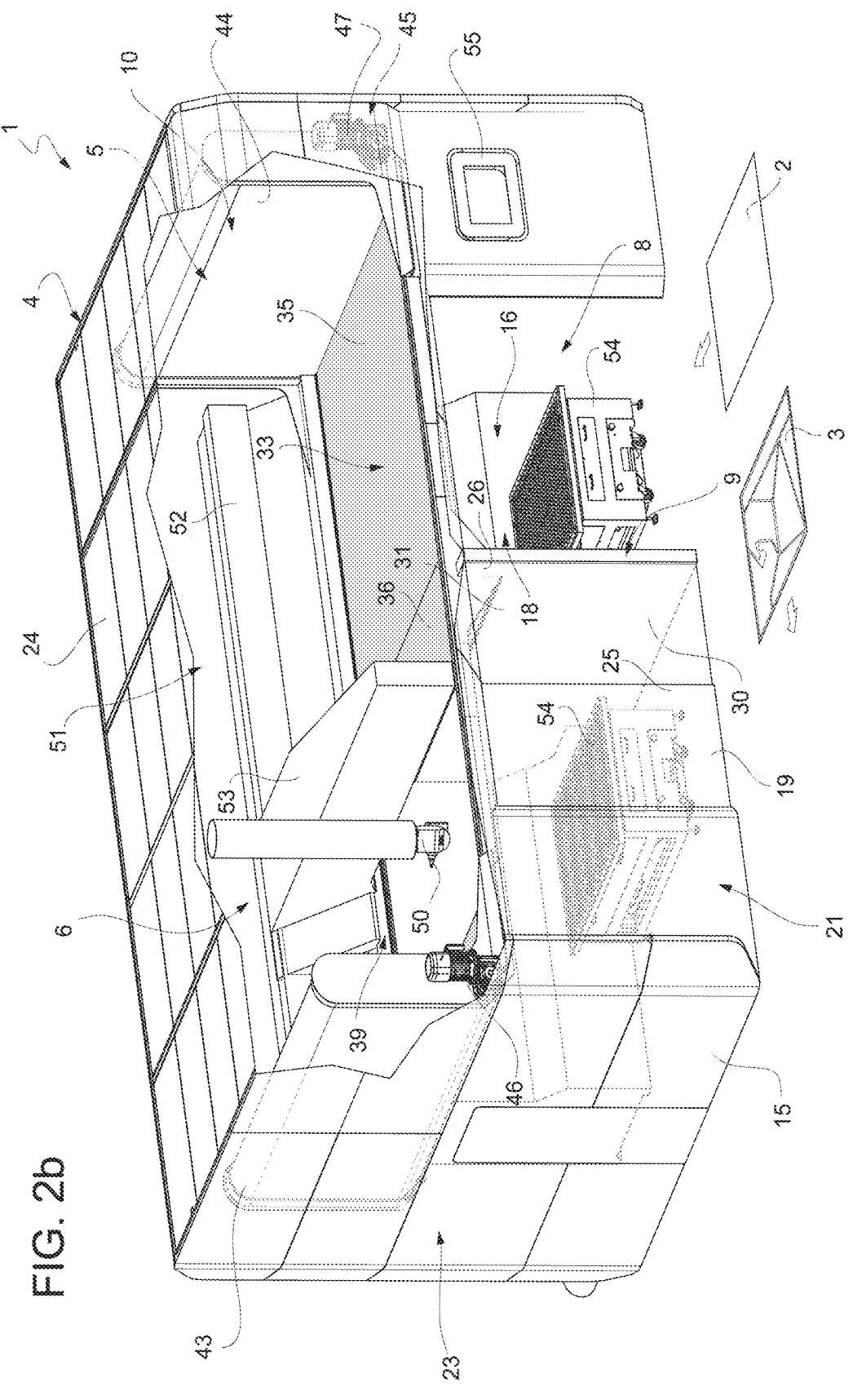

For example, in FIGS. 2a and 2b, the respective conditions in which the covering device 10 covers the first work space 7 and the second work space 8, respectively, are indicated.

This allows carrying out a laser processing in the work space 7 or 8 which is not covered by the covering device 10, while an operator can remove a processed piece 3 and/or insert a new work piece 2 in the other work space 7 or 8 (i.e. the work space 7 or 8 which is covered by the covering device 10).

In particular, the dividing wall 9 can define a respective lateral wall of the first work space 7 and of the second work space 8.

Preferentially, the dividing wall 9 extends vertically.

In more detail, the dividing wall 9 extends along an axis parallel to the second axis B and another axis parallel to the third axis C. Preferentially, an extension of the dividing wall 9 along an axis parallel to the axis A can define a width of the dividing wall 9.

Furthermore, the housing 4 can comprise two auxiliary lateral walls 15, each one being spaced from the dividing wall 9, in particular in a direction parallel to the first axis A. In particular, the dividing wall 9 can be interposed between the two auxiliary lateral walls 15 for partially delimiting the first work space 7 and the second work space 8.

More specifically, one of the auxiliary lateral walls 15 can delimit, together with the dividing wall 9, an extension (i.e. the respective length) of the first work space 7 along an axis parallel to the first axis A and the other auxiliary lateral wall 15 can delimit, together with the dividing wall 9, an extension (i.e. the respective length) of the second work space 7 along an axis parallel to the first axis A.

Furthermore, the housing 4 can also comprise a first auxiliary wall 16 and a second auxiliary wall transverse to, and in particular being in contact with, the dividing wall 9. In particular, the first auxiliary wall 16 and the second auxiliary wall are spaced apart from one another along a direction parallel to the third axis C and delimit the first work space 7 and the second work space 8 along the direction parallel to the third axis C.

Preferentially, the first auxiliary wall 16 and the second auxiliary wall can face one another.

Preferentially, the first auxiliary wall 16 can be placed in the inner space 5.

According to some preferred embodiments, the first auxiliary wall 16 and the second auxiliary wall comprise respective first portions and respective second portions, in which the respective first portions and the respective second portions delimit the first work space 7 and the second work space 8, respectively, in a direction parallel to the third axis C.

In particular, each first portion and each second portion is interposed and/or extends between the dividing wall 9 and a respective auxiliary lateral wall.

Preferentially, the housing 4, in particular the second auxiliary wall, can comprise a first entrance 17 and a second entrance 18 configured to allow access, for example to an operator and/or to a robot, to the first work space 7 and to the second work space 8, respectively.

More specifically, the first portion and the second portion of the second auxiliary wall can comprise the first entrance 17 and the second entrance 18, respectively.

In particular, the housing 4 can comprise a closing device configured to selectively open and close the first entrance 17 and the second entrance 18. More specifically, the closing device can comprise one or more doors, in particular sliding doors, so as to selectively open and close the first entrance 17 and the second entrance 18. Still more specifically, the closing device can comprise a first door 19, in particular a sliding door, configured to selectively open and close the first entrance 17 and a second door 20, in particular a sliding door, configured to selectively open and close the second entrance 18.

Preferentially, the closing device can be configured to open the first entrance 17 while, in use, the covering device covers the first work space 7 and/or the closing device can be configured to open the second entrance 18 while, in use, the covering device covers the second work space 8.

Furthermore, the closing device can be configured to close the first entrance 17 while, in use, the covering device does not cover (opens) the first work space 7 and/or the closing device can be configured to close the second entrance 18 while, in use, the covering device does not cover (opens) the second work space 8.

Preferentially, in use, the closing device closes the first entrance 17 while the laser apparatus 6 carries out a laser processing in the first work space 7 and/or the second entrance 18 while the laser apparatus 6 carries out a laser processing in the second space 8.

In further detail, the housing 4 can comprise a front wall 21, a rear wall 22 facing, and spaced apart from, the front wall 21, two lateral walls 23 spaced apart from one another and interposed between the front wall 21 and the rear wall 22 and a covering wall 24.

Preferentially, the housing 4 can also comprise a base support 25 facing, and spaced apart from, the covering wall 24. According to some non-limiting embodiments, the base support 25 can be formed by a respective wall and/or by a portion of a plane of a production site.

More specifically, the dividing wall 9, the front wall 21, the rear wall 22, the lateral walls 23 extend from the base support 25, in particular in a direction parallel to the second axis B, still more in particular vertically.

Preferentially, the front wall 21 can comprise the second auxiliary wall, the first entrance 17 and the second entrance 18. In particular, a portion of the front wall 21 can define the second auxiliary wall.

Preferentially, the front wall 21 can also comprise one or more housing spaces for the closing device, in particular the first door 19 and the second door 20.

Preferentially, each lateral wall 23 can comprise a respective auxiliary lateral wall 15. In other words, a portion of each lateral wall 23 defines a respective auxiliary lateral wall 15.

Furthermore, the dividing wall 9 can be transverse, in particular perpendicular, to the front wall 21.

Additionally, the first auxiliary wall 16 can be interposed between the front wall 21 and the rear wall 22.

With particular reference to FIGS. 1 to 6, the dividing wall 9 comprises at least one first end portion 30 configured to be in contact and/or being in contact with a support surface, in particular of the base support 25, and a second end portion 31 opposite the first end portion 30, in particular along a direction parallel to the second axis B.

In particular, a distance between the first end portion 30 and the second end portion 31 defines a main height of the dividing wall 9.

Preferentially, the first end portion 30 can define a lower portion of the dividing wall 9 and the second end portion 31 can define an upper portion of the dividing wall 9.

In particular, the dividing wall 9 extends from the first end portion 30 to the second end portion 31 towards the covering wall 24 and/or along an axis parallel to the second axis B.

According to the illustrated embodiment, the dividing wall 9 can also comprise a protruding portion 26 protruding from the second end portion 31 towards the covering wall 24. Preferentially, the protruding portion 26 is in contact with the second auxiliary wall and/or the front wall 21.

In particular, an extension of a portion of the second end portion 31 not in contact with the protruding portion 26 is at least five times, preferentially at least 10 times, greater than an extension of a portion of the second end portion from which the protruding portion 26 extends.

The covering device 10 comprises:
- a first cover 32 and a second cover 33, each controllable at least in an active configuration in which the first cover 32 and the second cover 33 are configured to cover and/or cover the first work space 7 and the second work space 8, respectively; and
- a guide system 34 configured to guide the first cover 32 and the second cover 33 so that the first cover 32 and the second cover 33, when they are in the respective active configurations, comprise at least a respective main portion 35 and a respective auxiliary portion 36 extending from the respective main portion 35.

Alternatively, the covering device 10 could comprise only a cover controllable in a first active configuration and a second active configuration. When such cover is in the first active configuration and in the second active configuration, the cover covers the first work space 7 and the second work space 8, respectively. Independently, when the cover is in the first active configuration and in the second active configuration, the cover comprises the respective main portion 35 and the respective auxiliary portion 36.

The guide system 34 is configured so that, being the first cover 32 and the second cover 33 in the active configuration, the respective auxiliary portion 36 is transverse and/or inclined relative to the respective main portion 35 and extends from the respective main portion 35 towards and/or to the dividing wall 9, in particular towards and/or to the second end portion 31.

Preferentially, each auxiliary portion 36 is not perpendicular to the respective main portion 35.

Preferentially, each auxiliary portion 36 and the respective main portion 35 can define an obtuse angle.

In particular, being the first cover 32 and the second cover 33 in the active configuration, the respective auxiliary portion 36 can be in contact with the dividing wall 9, in particular the second end portion 31.

Preferentially, the guide system 34 can be configured so that, being the first cover 32 and the second cover 33 in the active configuration, the respective main portion 35 is arranged at a first height level, which is above a second height level of the dividing wall 9, in particular of the second end portion 31.

In other words, the guide system 34 is configured so that, being the first cover 32 and the second cover 33 in the active configuration, the respective main portion 35 is arranged above the dividing wall 9, in particular of the second end portion 31.

In this manner, it is ensured that the respective auxiliary portion 36 light-proof closes a connection between the first work space 7 and the second work space 8 in the area of the dividing wall 9, in particular of the second end portion 31. Furthermore, it is ensured that the respective main portion 35 together with the respective auxiliary portion 36 covers and light-proof closes the first work space 7 or the second work space 8.

It should be noted that the terms "to light-proof close", "light-proof closing", "light-proof closed" indicate that the closing is such that light rays can neither exit nor enter from or into the first work space 7 and second work space 8 and through the first cover 32 and the second cover 33, respectively.

Preferentially, each main portion 35 has a (substantially) horizontal orientation and/or each main portion 35 is (substantially) parallel to the base support 25.

According to some non-limiting embodiments, each one of the first cover 32 and the second cover 33 can be controllable in a respective waiting configuration in which the first cover 32 and the second cover 33 are configured to free and/or free the first work space 7 and the second work space 8, respectively.

In particular, the housing 4 is configured so that one between the first cover 7 and the second cover 8 can be controlled in the respective active configuration while the other between the first cover 7 and the second cover 8 can be controlled in the waiting configuration. Furthermore, the housing 4 can also be configured to control the first cover 7 and the second cover 8 simultaneously in the respective active configuration or in the respective waiting configuration.

In more detail, each one of the first cover 32 and the second cover 33 can comprise a plurality of elongated elements, in particular along a longitudinal axis. In particular, the extension of the elongated elements along the longitudinal axis can define a length of the elongated elements. Still more in particular, the length of each elongated element can be greater than the respective thickness and of the respective width; it should be noted that the thickness and the width can be determined relative to respective axes perpendicular to one another.

According to some non-limiting embodiments, the elongated elements can be connected in a movable and/or flexible manner to one another. Preferentially, the elongated elements are hinged to one another. For example, the elongated elements can define a roller blind or a rolling shutter.

According to some non-limiting embodiments, each elongated element can be made in the shape of a stick, a panel, a slat, a flat profile, a table or the like.

Preferentially, the plurality of elongated elements are aligned with one another so as to define a blind cover when the respective first cover 31 or the respective second cover 32 is controlled in the respective active configuration. In other words, the plurality of elongated elements are aligned with one another so as to obtain a light-proof closed cover (the light cannot pass through the cover).

According to some non-limiting embodiments, the plurality of the elongated elements is at least partially windable.

Figure 5:
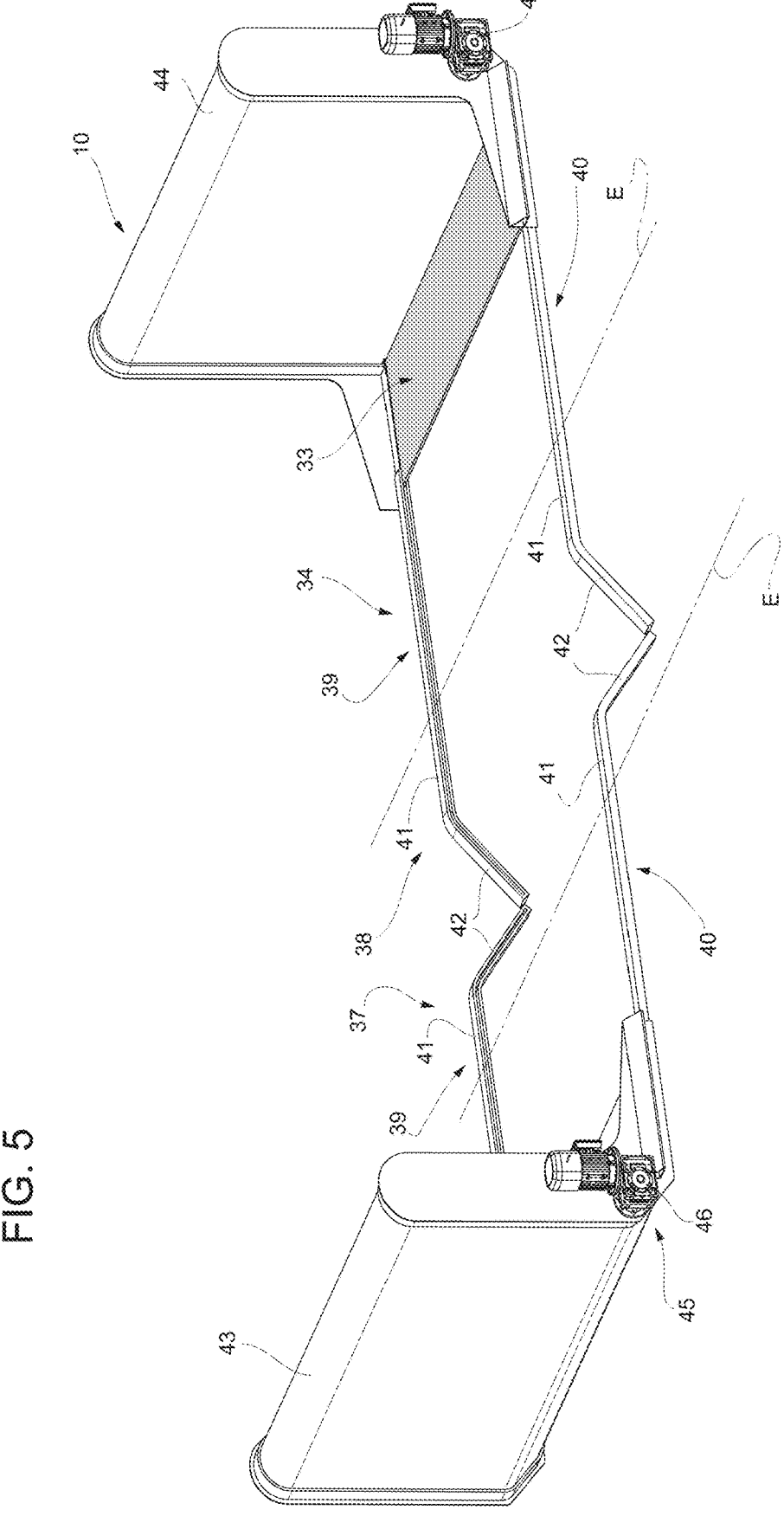
FIG. 5 shows an enlarged isometric view of a portion of the processing machine of FIG. 1, with parts removed for clarity.
Figure 6:
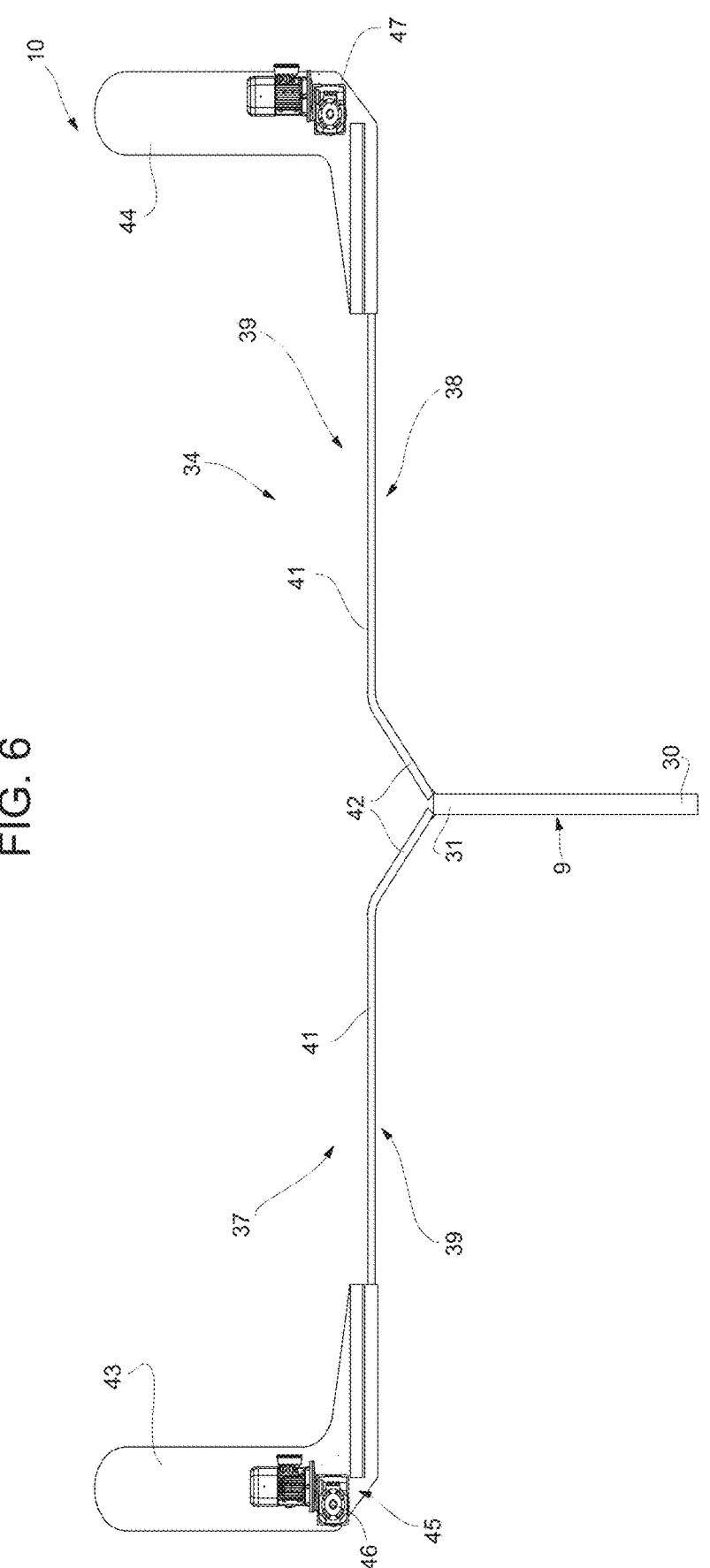
FIG. 6 shows a side view of a detail of the portion of FIG. 5, with parts removed for clarity.

With particular reference to FIGS. 5 and 6, the guide system 34 can comprise a first group of tracks 37 for guiding the first cover 32 so that the first cover 32, when it is in the active configuration, has at least the respective main portion 36 and the respective auxiliary portion 35; and a second group of tracks 38 for guiding the second cover 33 so that the second cover 33, when it is in the active configuration, has at least the respective main portion 35 and the respective auxiliary portion 36.

Alternatively and in case the housing 4 comprises a single cover, the guide system 34 comprises a group of tracks 37 which allows selectively placing the cover on top of the first work space 7 or the second work space 8.

In more detail, each one of the first group of tracks 37 and the second group of tracks 38 can comprise a respective first track 39 and a second track 40 spaced apart from one another along a respective axis E parallel to the third axis C.

Furthermore, each first track 39 and each second track 40 can comprise a first portion 41 and/or a second portion 42.

In particular, the first portions 41 can be made and/or configured to support and/or define the respective main portion 35 and/or the second portions 42 can be configured to support and/or define the respective auxiliary portion 36.

Additionally, each second portion 42 can be connected to and extends from the respective first portion 41 to the second end portion 32.

In particular, each second portion 42 can be inclined relative to the respective first portion 41.

Preferentially, each first portion 41 can extend along a longitudinal axis (substantially) parallel to the first axis A. Still more preferentially, each first portion 41 can be oriented horizontally.

More specifically, each first portion 41 can be (substantially) placed in the area of the first height level and/or the placing of each first portion 41 can define the first height level. Furthermore, each second portion 42 can (substantially) extend from the first height level to the second height level.

In particular, the first portions 41, in particular also the second portions 42, can be arranged above the dividing wall 9 and/or the second end portion 32.

According to some non-limiting embodiments, the housing 4 can also comprise a first housing device 43 and a second housing device 44 for housing the first cover 32 and the second cover 33, respectively, in particular when it is controlled in the respective waiting configuration.

Preferentially, the first housing device 43 can be arranged in a first lateral area of the housing 4, in particular of the inner space 5, and the second housing device 44 can be arranged in a second lateral area of the housing 4, in particular of the inner space 5, opposite the second lateral area.

More specifically, the first housing device 43 and the second housing device 44 can be spaced apart from one another along a direction parallel to the first axis A.

Furthermore, the first housing device 43 and the second housing device 44 can be arranged above the first work space 7 and the second work space 8, respectively.

Alternatively, the first housing device 43 and the second housing device 44 can be arranged at least partially or completely in the first work space 7 and in the second work space 8, respectively.

According to some non-limiting embodiments, the housing 4 can also comprise an actuating device 45 configured to selectively control the first cover 32 and the second cover 33 between the active configuration and the waiting configuration.

In particular, the actuating device 45 can be configured to control one between the first cover 32 and the second cover 33 in the active configuration and the other between the first cover 32 and the second cover 33 in the waiting configuration.

In more detail, the actuating device 45 can comprise:

a first actuator 46, in particular a first motor, operatively associated with the first cover 32 for controlling the first cover 32 between the respective active configuration and the respective waiting configuration; and a second actuator 47, in particular a second motor, operatively associated with the second cover 33 for controlling the second cover 33 between the respective active configuration and the respective waiting configuration.

In particular, in use, during the control of the first cover 32 and of the second cover 33 from the waiting configuration to the active configuration, the first cover 32 and the second cover 33 respectively move from the first housing device 43 and from the second housing device 44, respectively, towards the second end portion 31 up to establishing the contact between the respective auxiliary portion 36 and the second end portion 31.

Furthermore, in use, during the control of the first cover 32 and of the second cover 33 from the active configuration to the waiting configuration, the first cover 32 and the second cover 33 respectively move away from the second end portion 31 and towards and in the first housing device 43 and the second housing device 44, respectively.

With particular reference to FIGS. 1 to 4, the laser apparatus 6 can comprise one or more laser devices, in the specific case a laser device 50 is illustrated.

The laser apparatus 6 can also comprise a support structure 51, in particular arranged in the inner space 5, carrying the laser device 50 in a movable manner.

In more detail, the support structure 51 can comprise a fixed structure 52 and a movable structure 53 carrying the laser device 50 and coupled in a movable manner to the fixed structure 52. In particular, the movable structure 53 can be movable along a path, in particular a linear path.

Furthermore, the support structure 51 can comprise an actuator for moving the movable structure 53 along the path.

In further detail, the laser device 50 is coupled to the movable structure 53 so as to carry out respective angular movements around one or more rotation axes and a translation along a respective axis (substantially) parallel to the second axis B (for selectively approaching and spacing apart the laser device 50 to or from the work piece 2).

The movable structure 53 can allow selectively placing the laser device 50 in the first work space 7 and in the second work space 8.

According to some non-limiting embodiments, the laser processing machine 1 can also comprise two work tables 54, one arranged in the first work space 7 and the other in the second work space 8. Each work table 54 is configured to support the work pieces 2 (and then, the processed pieces 3).

According to some preferred non-limiting embodiments, the laser device 50 can be placed in a neutral area, in particular above the dividing wall 9. In particular, in use, while the laser device 50 is in the neutral area, it is possible to simultaneously control the first cover 32 and the second cover 33 in the respective active configurations or in the respective waiting configurations.

The laser processing machine 1 can further comprise a man-machine interface 55.

In use, the processing machine 1 laser-processes work pieces 2 for obtaining processed pieces 3.

In particular, the work pieces 2 are placed in the first work space 7 and in the second work space 8.

In order to carry out the processing, the laser device 50 has to be placed in the first work space 7 or in the second work space 8.

For example (see FIGS. 2b and 3c) the covering device 10 covers the first work space 7, in particular by means of the control of the respective first cover 32 in the active configuration, while the laser apparatus 6, in particular the laser device 50, carries out the laser processing of the work piece 2 placed in the second work space 8 while the second cover 33 is in the respective waiting configuration. Furthermore, the closing device, in particular the second door 20, closes the second entrance 18. Advantageously, during the laser processing of the work piece 2 present in the second work space 8, it is possible, for example through an operator or a robot, to remove a processed piece 3 from the first work space 7 and/or to place a new work piece 2 in the first work space 7.

Figures 3A, 3B, 3C:
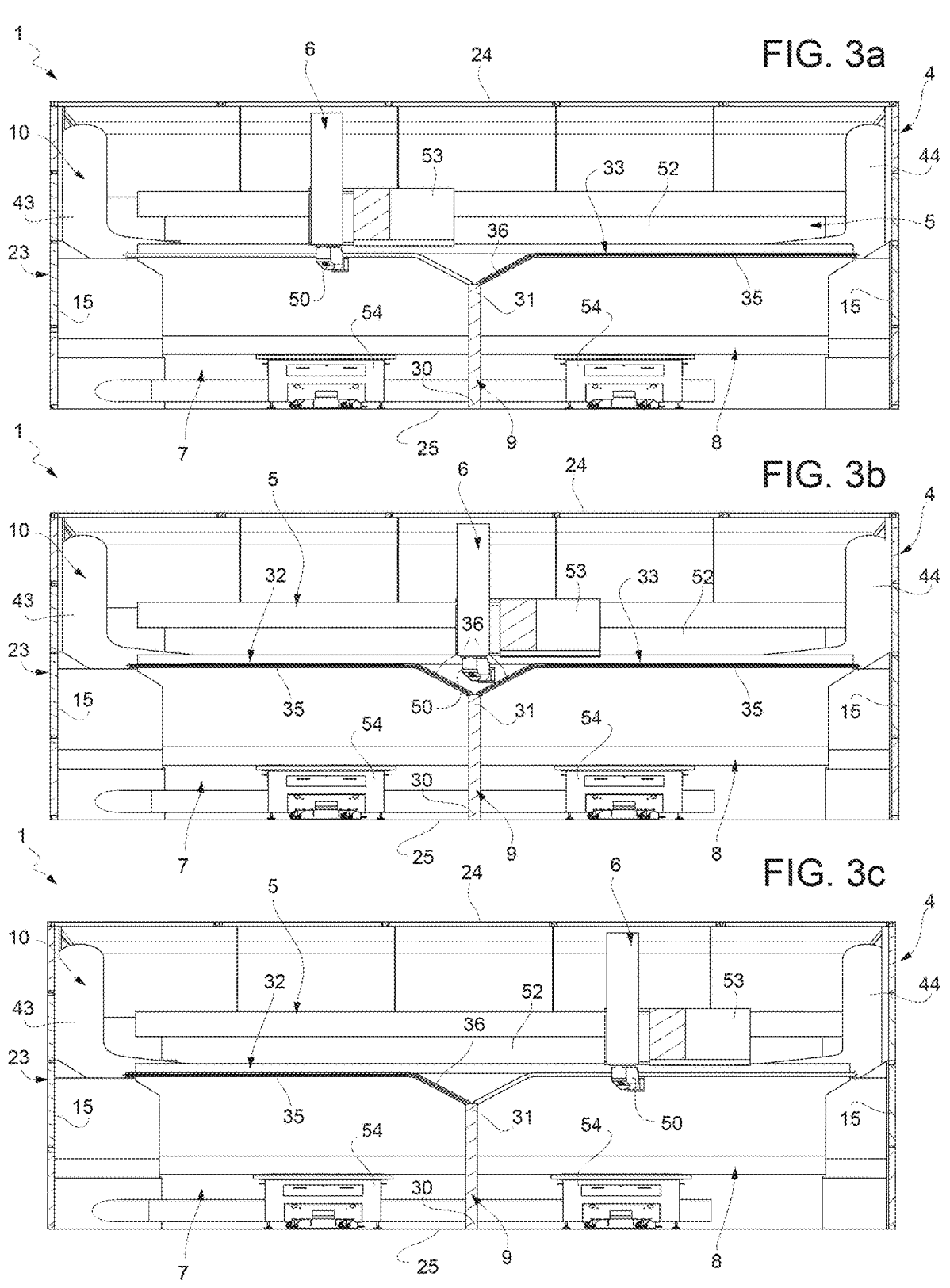
FIGS. 3a, 3b and 3c show a section view of the laser processing machine in the work configurations of FIGS. 2a and 2b and an intermediate configuration.
Figure 4:
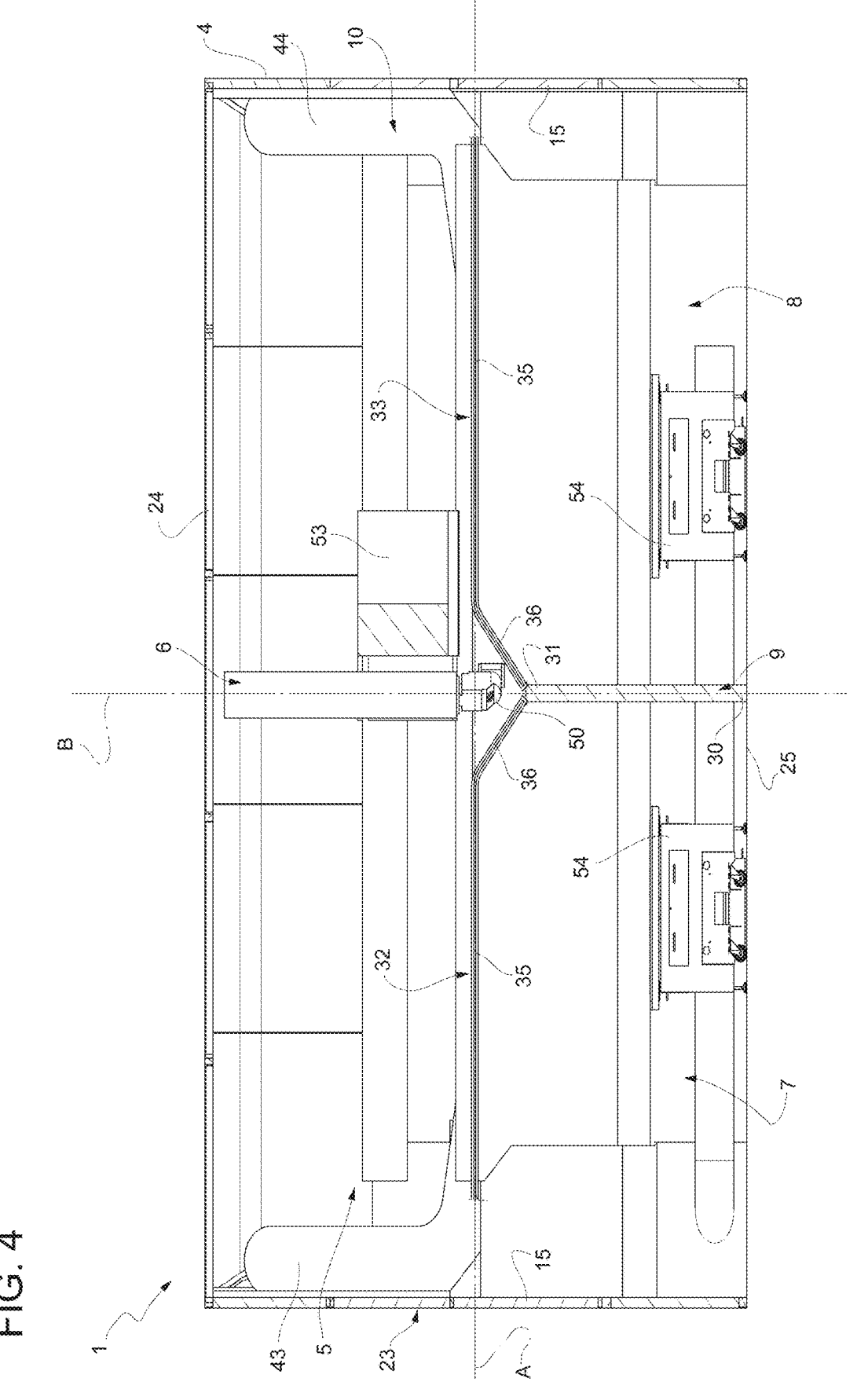
FIG. 4 shows an enlarged section view of the laser processing machine in the intermediate configuration, with parts removed for clarity.

In the other example (see FIGS. 2a and 3a), which can be carried out before or after the example of FIGS. 2b and 3c, the covering device 10 covers the second work space 8, in particular by means of the control of the respective second cover 33 in the active configuration, while the laser apparatus 6, in particular the laser device 50, carries out the laser processing of the work piece 2 placed in the first work space 7 while the first cover 32 is in the respective waiting configuration. In this case, the closing device, in particular the first door 19, closes the first entrance 18. According to this example, during the laser processing of the work piece 2 present in the first work space 7, it is possible, for example through an operator or a robot, to remove a processed piece 3 from the second work space 8 and/or to place a new work piece 2 in the second work space 8.

In order to carry out at times the laser processing in the first work space 7 and at times in the second work space 8 it is necessary to transfer the laser device 50 from the first work space 7 or from the second work space 8 to the second work space 8 or to the first work space 7. For this reason, it is necessary to control the first cover 32 and the second cover 33 from the active configuration to the waiting configuration if the laser processing was carried out in the second work space 8 or in the first work space 7, respectively.

During or following the transfer of the laser device 50 from the first work space 7 to the second work space 8 or vice versa, it is possible to control the first cover 32 or the second cover 33, respectively, from the waiting configuration to the active configuration.

It should be noted that it is also possible to control the first cover 32 and the second cover 33 simultaneously in the respective active configuration or in the respective waiting configuration. Preferentially, also the first door 19 and the second door 20 are respectively controlled for opening and closing the first entrance 17 and the second entrance 18, respectively, when the first cover 32 and the second cover 33 are respectively controlled in the respective active configurations and in the respective waiting configurations.

For example (see for example FIG. 3b), it is possible to control both the first cover 32 and the second cover 33 in the respective active configurations, while the laser device 50 is placed in the neutral area. Preferentially, when the first cover 32 and the second cover 33 are simultaneously in the respective active configurations or in the respective waiting configurations, the closing device simultaneously opens and closes the first entrance 17 and the second entrance 19, respectively.

It should be noted that in this manner it is possible to carry out a processing first in one between the first work space 7 and the second work space 8 and then in the other, while the processed pieces 3 are removed and new work pieces 2 are loaded after the processing in the first work space 7 and in the second work space 8.

In more detail, during the control of the first cover 32 and of the second cover 33 from the active configuration to the waiting configuration or from the waiting configuration to the active configuration, the first group of tracks 37 and the second group of tracks 38 guide the movement of the first cover 32 and of the second cover 33, respectively.

During the movement from the waiting configuration to the active configuration, the respective main portions 35 and the respective auxiliary portions 36 are obtained.

By examining the characteristics of the processing machine 1 and/or of the housing 4 according to the present invention, the advantages that they allow obtaining are evident.

A first advantage lies in the fact that it is possible to place the laser device 50 in the neutral area so that the laser device 50 can be placed in the first work space 7 or in the second work space 8 depending on whether the first work space 7 or the second work space 8 is ready for first.

Another advantage lies in the fact that the first cover 32 and the second cover 33 can be controlled independently of one another without creating an interference with the laser device 50.

Another advantage lies in the fact that by means of the closing device 10 it is possible to decrease the time necessary for placing the laser device 50 from the first covering space 7 to the second covering space 8 or vice versa. This is possible because it is not necessary to operate a closing element which requires time, but only the first cover 32 and the second cover 33. Furthermore, it is not necessary to place the laser device 50 relative to the opening freed by the closing element.

Another advantage lies in the fact of having removed the closing element which proved to be a component with a critical reliability.

Furthermore, the closing element is a costly element and with its elimination a more cost-effective solution is obtained.

Finally, it is clear that modifications and variations can be made to the described and illustrated processing machine 1 and/or housing 4, which do not depart from the scope of protection defined by the claims.

According to some alternative embodiments, each auxiliary portion 36 is substantially perpendicular to the main portion 35. Furthermore, the first cover 32 or the second cover 33 can comprise a further portion connected to the auxiliary portion 36 and configured to extend towards and/or to the dividing wall 9.

The invention claimed is:

1. A housing (4) for a laser processing machine (1) to treat, by means of a laser, workpieces (2);

the housing (4) comprises:

a dividing wall (9), which separates a first work space (7) and a second work space (8); and a covering device (10), which is configured to selectively cover at least one between the first work space (7) and the second work space (8);

wherein the first work space (7) and the second work space (8) are configured to receive the workpieces (2);

wherein the covering device (10) comprises at least:

a cover (32; 33), which is controllable at least in an active configuration, in which the cover (32; 33) is configured to cover one between the first work space (7) and the second work space (8); and a guide system (34), which is configured to guide the cover (32; 33) so that the cover (32; 33), when the cover (32; 33) is in the active configuration, comprises at least a main portion (35) and an auxiliary portion (36) extending from the main portion (35);

wherein the auxiliary portion (36) is inclined relative to the main portion (35) and extends from the main portion (35) towards and/or to the dividing wall (9); and wherein the housing further comprises:

a first entrance (17) to allow access to the first work space (7);

a second entrance (18) to allow access to the second work space (8); and a closing device (19; 20), which is configured to selectively open and close the first entrance (17) and the second entrance (18);

wherein the closing device (19; 20) is configured to open the first entrance (17) while, in use, the covering device (10) covers the first work space (7); and/or wherein the closing device (19; 20) is configured to open the second entrance (18) while, in use, the covering device (10) covers the second work space (8).

2. The housing according to claim 1, wherein the guide system (34) is configured so that the main portion (35) is arranged above the dividing wall (9).

3. The housing according to claim 1, wherein the dividing wall (9) comprises at least a first end portion (30) configured to be in contact and/or being in contact with a support surface and a second end portion (31) opposite the first end portion (30);

wherein the guide system (34) is configured so that the main portion (35) is arranged above the second end portion (31) and/or the main portion (35) is arranged at a first height level, which is above a second height level of the second end portion (31).

4. The housing according to claim 1, wherein the cover (32; 33) comprises a plurality of elongated elements connected to one another in a movable and/or flexible manner.

5. The housing according to claim 1, wherein the guide system (34) comprises at least one group of tracks (37; 38) configured to guide the cover (32; 33);

wherein the dividing wall (9) extends from a first end portion (30) to a second end portion (31) along a first axis (B);

wherein the dividing wall (9) extends also along a second axis (C), which is transverse and/or perpendicular to the first axis (B);

wherein the group of tracks (37; 38) comprises at least a first track (39) and a second track (40), which are spaced apart from one another along an axis, which is parallel to the second axis (C);

wherein each one of the first track (39) and the second track (40) comprises a first portion (41) and a second portion (42);

wherein the first portions (41) are configured to support and/or define the main portion (35) and the second portions (40) are configured to support and/or define the auxiliary portion (36);

wherein each second portion (40) is connected to and extends from the respective first portion (39) to the second end portion (40).

6. The housing according to claim 1, wherein the covering device (10) comprises:

a first cover (32), which is configured to selectively cover the first work area (7) when the first work area (7) is in the respective active configuration; and a second cover (33), which is configured to selectively cover the second work area (8) when the second work area (8) is in the respective active configuration;

wherein the guide system (34) comprises:

a first group of tracks (37) to guide the first cover (32) so that the first cover (32), when the first cover (32) is in the active configuration, has at least the respective main portion (35) and the respective auxiliary portion (36); and a second group of tracks (38) to guide the second cover (33) so that the second cover (33), when the second cover (33) is in the active configuration, has at least the respective main portion (35) and the respective auxiliary portion (36).

7. The housing according to claim 6, wherein each one of the first cover (32) and the second cover (33) is controllable in a respective waiting configuration, in which the first cover (32) and the second cover (33) are configured to free the first work space (7) and the second work space (8), respectively.

8. The housing according to claim 7 and further comprising a first housing device (43) and a second housing device (44) to house the first cover (32) and the second cover (33), respectively, when the first cover and the second cover are controlled in the respective waiting configuration;

wherein the first housing device (43) is arranged in a first lateral area of the housing (4) and the second housing device (44) is arranged in a second lateral area of the housing (4) opposite the first lateral area.

9. The housing according to claim 1, wherein the workpieces (2) are metal workpieces.

10. A laser processing machine (1) to treat, by means of a laser, workpieces (2):

a housing (4) according to claim 1; and at least one laser apparatus (6), which is configured to carry out a laser processing in the first work space (7) and in the second work space (8).

11. The laser processing machine according to claim 10, wherein the laser apparatus (6) is configured to carry out a laser processing in the first work space (7) and in the second work space (8) while the covering device (10) covers the second work space (8) and the first work space (7), respectively.

12. The laser processing machine according to claim 10, wherein the laser apparatus (6) comprises at least one laser device (50), which can selectively be placed in the first work space (7) and in the second work space (8) in order to carry out a laser processing in the first work space (7) and in the second work space (8), respectively.

13. The laser processing machine according to claim 10, wherein the workpieces (2) are metal workpieces.

14. A housing (4) for a laser processing machine (1) to treat, by means of a laser, workpieces (2);

the housing (4) comprises:

a dividing wall (9), which separates a first work space (7) and a second work space (8); and a covering device (10), which is configured to selectively cover at least one between the first work space (7) and the second work space (8);

wherein the first work space (7) and the second work space (8) are configured to receive the workpieces (2);

wherein the covering device (10) comprises at least:

a cover (32; 33), which is controllable at least in an active configuration, in which the cover (32; 33) is configured to cover at least one of the first work space (7) and the second work space (8); and a guide system (34), which is configured to guide the cover (32; 33) so that the cover (32; 33), when the cover (32; 33) is in the active configuration, comprises at least a main portion (35) and an auxiliary portion (36) extending from the main portion (35);

wherein the auxiliary portion (36) is inclined relative to the main portion (35) and extends from the main portion (35) towards and/or to the dividing wall (9);

wherein the guide system (34) comprises at least one group of tracks (37; 38) configured to guide the cover (32; 33);

wherein the dividing wall (9) extends from a first end portion (30) to a second end portion (31) along a first axis (B);

wherein the dividing wall (9) extends along a second axis (C), which is transverse and/or perpendicular to the first axis (B);

wherein the at least one group of tracks (37; 38) comprises at least a first track (39) and a second track (40), which are spaced apart from one another along an axis, which is parallel to the second axis (C);

wherein each one of the first track (39) and the second track (40) comprises a first portion (41) and a second portion (42);

wherein the first portions (41) are configured to support and/or define the main portion (35) and the second portions (40) are configured to support and/or define the auxiliary portion (36);

wherein each second portion (40) is connected to and extends from the respective first portion (39) to the second end portion (40).

15. A laser processing machine (1) to treat, by means of a laser, workpieces (2), comprising:

a housing (4) according to claim 14; and at least one laser apparatus (6), which is configured to carry out a laser processing in the first work space (7) and in the second work space (8).

16. The laser processing machine according to claim 15, wherein the at least one laser apparatus (6) is configured to carry out a laser processing in the first work space (7) and in the second work space (8) while the covering device (10) covers the second work space (8) and the first work space (7), respectively.

17. The laser processing machine according to claim 15, wherein at laser apparatus (6) comprises at least one laser device (50), which can selectively be placed in the first work space (7) and in the second work space (8) in order to carry out a laser processing in the first work space (7) and in the second work space (8), respectively.

* * * * *